(No Model.)
J. W. MacDONALD.
OILING CAN.
No. 385,417. Patented July 3, 1888.
Fig. 1.
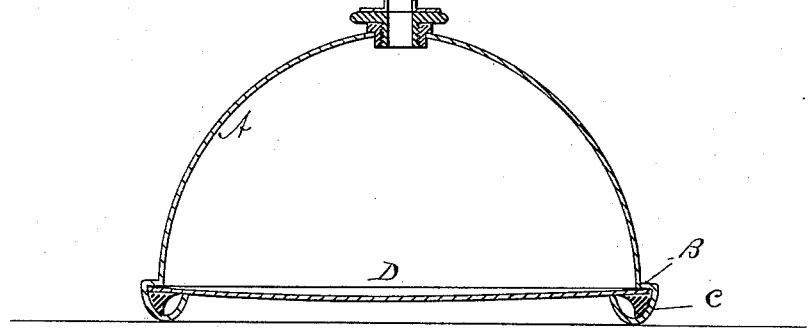
Fig. 2.
WITNESSES: INVENTOR,
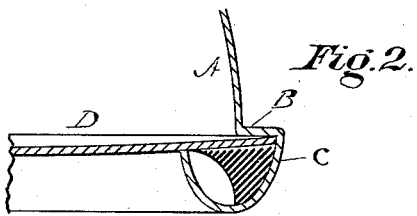

UNITED STATES PATENT OFFICE.

JOHN W. MacDONALD, OF PITTSBURG, PENNSYLVANIA.

OILING-CAN.

SPECIFICATION forming part of Letters Patent No. 385,417, dated July 3, 1888.

Application filed November 9, 1887. Serial No. 254,726. (No model.)

*To all whom it may concern:*

Be it known that I, JOHN W. MACDONALD, of Pittsburg, in the county of Allegheny and State of Pennsylvania, have invented a certain new and useful Improvement in Sheet-Metal Oiling-Cans; and I do hereby declare the following to be a full, clear, and exact description thereof.

My invention relates to oiling-cans composed of sheet metal and having a spring or flexible bottom, and in which it is required that the bottoms thereof be joined to the sides of the same by a tight and lasting joint; and it consists of an improvement by which a can may be produced that will remain tight under the roughest usage.

Great difficulty has heretofore been met with in producing these cans, to overcome which they have been made of various metals and the bottoms joined to the sides thereof in many ways.

It has been found that the most durable can for the purpose is one composed of sheet-iron or steel, having the bottom joined to its sides by brazing. Such has been the state of the art that those skilled in it have not been able to bring sufficient brazing material while in its fluid state in contact at once with the sides and bottom of a can around its entire circumference and keep it there in the course of brazing until it has cooled or become fixed to make such a joint as is required, so that in the brazed-bottom cans heretofore produced but very little of the brazing material adheres to the sides of the can, nearly all the braze being upon the bottom. This failure to get the braze to adhere in sufficient quantity to the sides of the can in putting in the bottom results in making a weak joint, and when subject to rough usage and under the constant working in and out of the flexible or spring bottom is very liable to break and become leaky. By a method of manufacture which I employ I overcome all the difficulties heretofore met with in the manufacture of such a can as is demanded, and produce an oiling-can finely finished and having the bottom so joined to its sides that it will have a highly resilient bottom and a tight and lasting joint between the latter and sides of the can.

Figure 1 of the accompanying drawings is a vertical cross-section of an oiling-can showing my improvement. Fig. 2 is a similar view, on an enlarged scale, of that portion of the can where the bottom joins the body.

My can may be made of any sheet metal; but I prefer iron or steel.

Reference being had to the accompanying drawings, A, Fig. 1, represents the body of my can, having near its base a shoulder or bottom-support, B. Against the shoulder B and inside the body-extension C is placed the bottom D. The joint between said bottom D and the body is formed of a soldering or brazing material equally distributed on the bottom and a part of that portion of the body extending below the bottom and around the entire circumference of said bottom. The metal, C, of the body A, extending below the bottom D and shoulder B, is crimped or turned inward and against the outside of the bottom—not against the metal of which the joint is formed, but in such a way as to leave an annular space on the bottom around its entire circumference, forming a hollow base or stand for the can to rest upon. The distribution of the braze in large quantity upon the sides of the can forms between said sides and bottom a bracket-shaped body of brazing metal that gives great strength to the joint, and the metal, C, of the body A, being turned inward and against the outside of the bottom in the form shown, acts as a protection to the joint and braces or reenforces the bottom.

I am aware that it is not new to make a can having the bottom set within the walls of its body and having the base of the body lapped or crimped over onto and against the outside of the bottom and then brazed or soldered; nor do I claim such; but What I do claim, and desire to secure by Letters Patent, is—

1. A sheet-metal oiling-can having the body thereof extending down below the bottom of the can and having said body-extension crimped over in such shape against the outside of the bottom as to form an annular space, and a soldering or brazing material within the space.

2. A sheet-metal oiling-can having a spring or flexible bottom, and having near its base a shoulder or bottom-support, against which the bottom is held by the metal of the body below said bottom turned inward and against the outside of said bottom, the said bottom and body being joined by soldering or brazing material placed within an annular space formed by the metal of the can-body below the bottom of the can.

In testimony whereof I have signed my name.

JOHN W. MacDONALD.

Witnesses:
T. A. WRIGHT,
C. M. CLARKE.